United States Patent [19]

Holtey et al.

[11] Patent Number: 5,322,494
[45] Date of Patent: Jun. 21, 1994

[54] HIGH SPEED SPINDLE UNIT AND DRIVER

[75] Inventors: James O. Holtey, Rockford, Ill.; Paul A. S. Charles, Larne, Northern Ireland; Kugalur S. Chandrasekaran, Rockford, Ill.

[73] Assignee: The Ingersoll Milling Machine Company, Rockford, Ill.

[21] Appl. No.: 112,647

[22] Filed: Aug. 26, 1993

Related U.S. Application Data

[63] Continuation of Ser. No. 824,839, Jan. 22, 1992, abandoned.

[51] Int. Cl.$^5$ ............ B23Q 3/157; B23B 29/00; B23C 5/26
[52] U.S. Cl. ............ 483/12; 408/239 R; 409/230; 409/231
[58] Field of Search ............ 483/31, 32; 409/202, 409/203, 213, 230, 231, 232, 233, 234; 408/239 R, 238

[56] References Cited

U.S. PATENT DOCUMENTS

| | | | |
|---|---|---|---|
| 2,286,292 | 6/1942 | Mall | 279/1 |
| 3,688,362 | 9/1972 | Durr et al. | 483/32 |
| 3,757,637 | 9/1973 | Eich | 409/230 |
| 3,775,837 | 12/1973 | Tomita et al. | 29/568 |
| 3,811,179 | 5/1974 | Anderson | 29/568 |
| 4,084,300 | 4/1978 | Narushima et al. | 29/26 A |
| 4,196,506 | 4/1980 | Reed | 29/568 |
| 4,312,111 | 1/1982 | Peiser et al. | 29/568 |
| 4,335,498 | 6/1982 | Hague et al. | 29/568 |
| 4,343,077 | 8/1982 | Satoh et al. | 26/568 |
| 4,358,888 | 11/1982 | Zankl et al. | 29/568 |
| 4,427,325 | 1/1984 | Kielma et al. | 483/32 X |
| 4,443,929 | 4/1984 | Bayer et al. | 483/32 |
| 4,587,716 | 5/1986 | Bytow | 29/568 |
| 4,602,901 | 7/1986 | Ramusino | 409/213 X |
| 4,620,824 | 11/1986 | Eckstein et al. | 409/233 |
| 4,649,610 | 3/1987 | Onishi et al. | 483/32 |
| 4,709,465 | 12/1987 | Lewis et al. | 29/568 |
| 4,720,221 | 1/1988 | Yoshioka et al. | 409/230 |
| 4,759,115 | 7/1988 | Kielma | 483/32 |
| 4,867,618 | 9/1989 | Brohammer | 408/39 |
| 4,927,304 | 5/1990 | Hauser | 409/231 |
| 4,944,638 | 7/1990 | Brohammer | 408/59 |

FOREIGN PATENT DOCUMENTS

| | | | |
|---|---|---|---|
| 0170837 | 5/1986 | European Pat. Off. | |
| 2711238 | 9/1978 | Fed. Rep. of Germany | |
| 3621799 | 2/1987 | Fed. Rep. of Germany | 483/32 |
| 59-42235 | 3/1984 | Japan | |
| 183305 | 7/1989 | Japan | 483/31 |
| 673421 | 7/1979 | U.S.S.R. | 409/230 |

Primary Examiner—William Briggs
Attorney, Agent, or Firm—Fitch, Even, Tabin & Flannery

[57] ABSTRACT

High speed cutting with machine tools is achieved with readily available bearings of a small diameter by mounting and presetting the cutting tool directly in a spindle of a spindle unit without employing a tool holder. Preferably, the spindle unit is small like a tool holder and can be easily changed with conventional kinds of tool changing apparatus. The elimination of the tool holder allows the conventional bearings to be kept small so that they may be operated at high speeds, e.g., 20,000 to 40,000 rpm, without excessive heat that would damage the bearings.

34 Claims, 5 Drawing Sheets

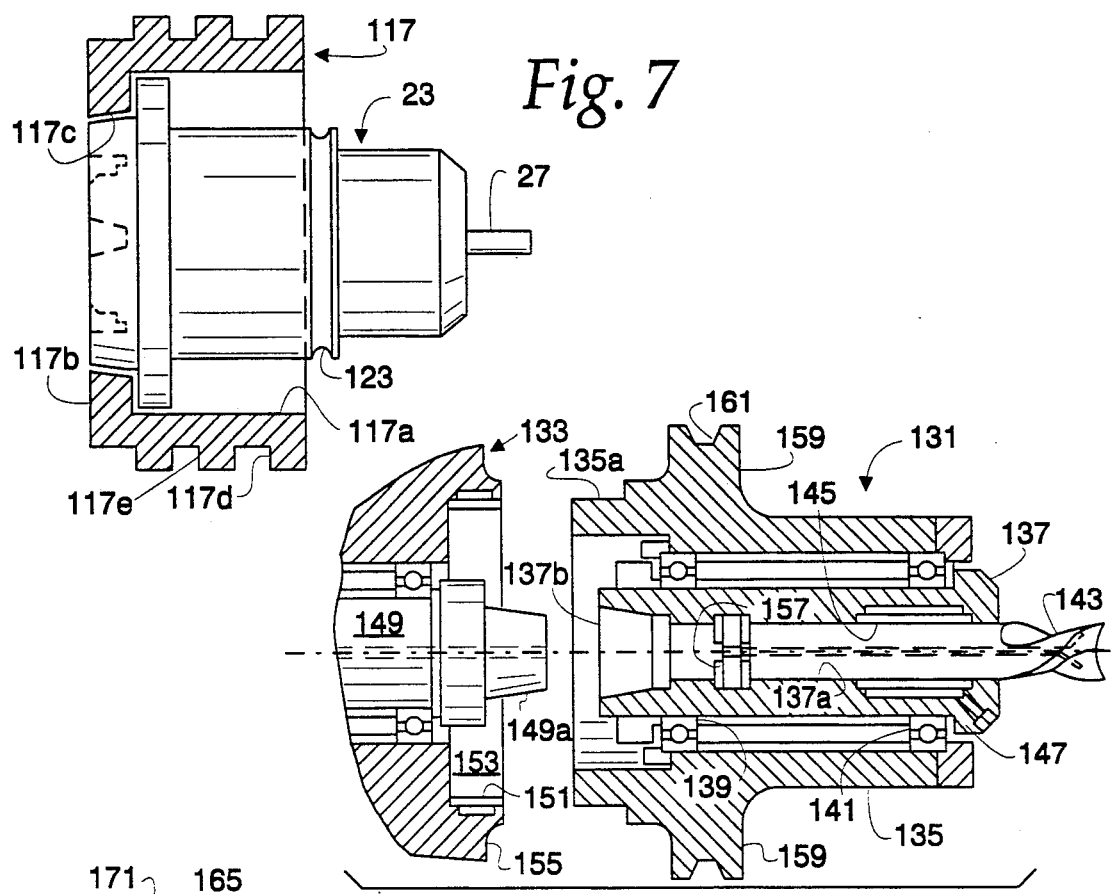
*Fig. 7*
*Fig. 8*
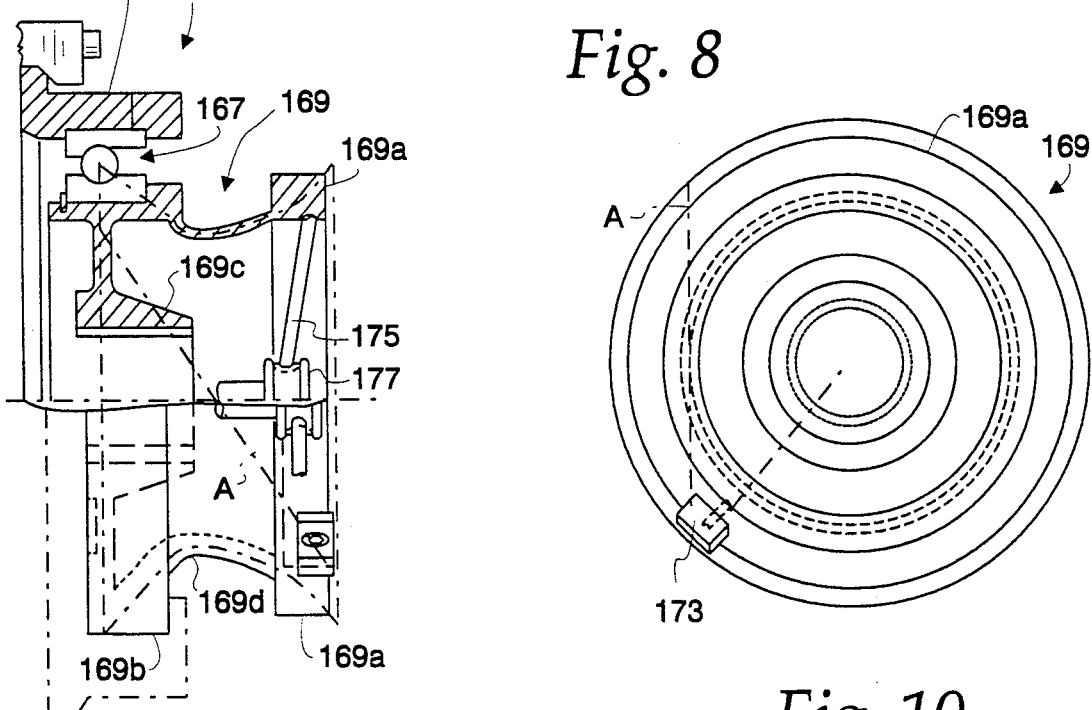
*Fig. 9*
*Fig. 10*

HIGH SPEED SPINDLE UNIT AND DRIVER

This application is a continuation of application Ser. No. 824,839 filed Jan. 22, 1992, now abandoned.

BACKGROUND OF THE INVENTION

This invention relates generally to apparatus for mounting and driving rotary cutting tools of the type used in drilling, boring and milling and more specifically to a spindle unit used with a motorized driver to cut materials such as metal, plastic, wood, etc., and tool carrying spindle units which are automatically interchanged by an automatic spindle changer. The spindle unit is particularly useful for high speed rotary cutting operations at, for example, 40,000 rpm.

In high speed operations, e.g., at 30,000 to 40,000 rpm, the bearings of spindles typically are expensive and of a large diameter and are provided with special lubrication systems, making them very costly. For a number of applications, the ability to rotate a cutting tool at substantially higher speeds than normal will result in better finish cuts, faster removal of material and less vibration or chatter where a thin web of material is being cut. For example, in cutting aluminum plate to form lightweight, high-strength structures for airplanes or the like, it is desirable to be able to cut out large amounts of aluminum, leaving behind a surface layer reinforced by a network of ribs or webs. To form such pieces in a more economical manner, the speed of cutting and the ability to change tools automatically for the rough and finish cuts is important. High speed cutting is also important when cutting very thin wall parts because, at low speeds, it may be necessary to apply such force by the tool against the thin wall that the thin wall may deflect in order to cut, whereas a very high speed tool may make the same cut without having to be pressed against the thin wall with such a high force as to deflect the thin wall part. Also, generally speaking, the smaller the tool diameter the more desirable it becomes to run the tool faster. The forces applied by the tool to the workpiece may be brought down when the tool speed is brought up. While some individual cutting tools have been operated at very high speeds using special lubricated bearing systems, there is no practical high speed cutting tool system in use today, that uses conventional bearings and lends itself to use with conventional automatic tool changers.

In most common use today are automatic tool changers in which the cutting tool is mounted to a tool adapter or tool holder which is of a large diameter and heavy body and which is stored in a matrix or storage device such as in a magazine, in a rack, or in a line. Typically, the tool holder has a tapered end opposite the tool for seating in a tapered socket in a spindle unit of a machine tool, and has a knob end to be gripped by a gripper or draw bolt mechanism or the like for pulling and clamping the tool holder tightly in the spindle socket. The tool is usually preset in the tool holder and is balanced and checked for length of projection from the tool holder so that once the tool holder is properly seated in the spindle, the tool is ready to cut.

The mass of the typical tool holder and the tool, and their larger size, precludes their use at high speeds for typical machining operations because the inside diameter of the bearing in millimeters (D) is already so large that when it is multiplied by the number of revolutions per minute (N) of the bearing, a DN value of 1,000,000 results, which is the usual upper limit for conventional bearings used in machine tools. More specifically, when the multiplication product of DN is greater than 1,000,000, special precautions must be taken regarding bearing materials, lubrication and mounting to minimize the effects of friction and heat, resulting in expensive and impractical conditions for use of the bearing for a machine tool application. The present invention is directed to using readily available bearings in a spindle to support a tool for high speed rotation where the product of DN is approximately 1,000,000. When reference is made herein to "readily available" bearings, it is intended to include ball bearings commercially available for high speed applications, rather than low speed ball bearings or high speed bearings having special cooling facilities. By keeping the bearing diameters small, the rotational peripheral velocity of the ball bearings may be kept low while the rotational velocity of the tool may be increased to a high velocity. To this end, the present invention eliminates the large size and mass of the conventional tool holder and yet allows for automatic tool changing with conventional types of tool changers.

The tool holder and the draw bolt mechanism which retains the tool holder are of considerable mass and this mass must be rotated by the machine spindle along with the tool itself. This large mass, and the fact that it is cantilevered from the forward end of the machine spindle, is also a deterrent to high speed operation of the tool. The proper alignment of the tool and the tool holder so that this mass rotates coaxially with the spindle shaft becomes more important at elevated speeds. Any eccentricity or misalignment has serious consequences at such speeds. This problem is magnified by the fact that this eccentric mass is centered at a point spaced well forward of the front spindle bearing. Also, balancing of the tool and tool holder is more of a problem at high speed than at low speed. With the vibrations produced by any eccentricity of the tool and the tool holder applying a cantilever loading on the forward end of the spindle shaft, there is a further amplification of these vibrations. Additionally, improper mating of the tool holder to the spindle may result from obstructions between the mating faces such as dirt, metal chips or coolant residue. This in turn would cause further unbalance and vibration.

The tool holders have typically included a sharply tapered shank which cooperates with the tapered socket at the end of the spindle shaft to try to obtain concentricity of the tool and tool holder with respect to the spindle axis. This tool holder structure either increases the size of the front spindle bearing or causes the bearing to be located further inward from the end of the spindle shaft. In the latter case, there results a greater overhang or cantilevering of the spindle shaft with the accompanying eccentricity and increased bearing load problems. For these and various other reasons, the present approach to mounting, drilling, boring and milling tools in large tool holders, which are mounted for rotary movement extending from the outer end of a spindle shaft, is not satisfactory when applied to machining applications requiring high rotational speeds.

Another undesirable attribute of the presently used high mass tool holder relates to increased machine time required to accelerate the tool holder to its desired cutting speed and decelerate it upon completion of a cutting operation. In automated machining operations, many tools are used in successive machining operations so the time lost in accelerating the high mass tool holder up to and down from the desired cutting speed may be a very substantial portion of the overall machining time. Any reduction in the mass of the tool holder would result in shorter acceleration times and an improvement in machine efficiency.

The assignee of this application has heretofore developed a master head for very large milling machines to which a variety of individual, very large spindle units are assembled. Typically, the spindle units weigh several thousand pounds and are driven at slow or conventional speeds and cannot be operated at those high speeds desired for the spindle units of the present invention. This master head approach represents a departure from the concept of automatically changing tools to that of automatically changing spindle units. The master head and interchangeable spindle units are disclosed in the U.S. Pat. to Lewis et al. U.S. Pat. No. 4,709,465, which is assigned to the same assignee as the present application. The spindle units disclosed in the Lewis et al. patent are not light in weight and are not suited to the high rotational speed operation, as discussed above.

It is known in the art to use lightweight chucks and collets for mounting various types of rotary cutting tools directly on a shaft or spindle of a machine. One such collet type mounting spindle is disclosed in the U.S. Patent to Wall U.S. Pat. No. 2,286,292. Such devices are not suited for high speed industrial applications of the type described above for several reasons. If the tool is to be used in an automated machine in which the tool is selectively applied to a motorized driver to perform a particular cutting operation, some type of the tool holder is used. The tool is selectively mounted in the tool holder so that a desired depth or length of cut is achieved when the tool is automatically placed in its driving position in each cycle. Accordingly, some type of tool holder is required to permit the automatic loading and positioning of the tool. In addition, tool holders are needed to permit such automated machine to accommodate a wide variety of tool sizes which are driven by the same motorized driver.

SUMMARY OF THE INVENTION

The present invention involves use of interchangeable spindle units as tool holders for drivingly interconnecting rotary, high speed cutting tools to a motorized driver. Each spindle unit includes a stationary housing having one or more spaced conventional bearings which support a rotary spindle. The spindle is formed with an axial bore for receiving the shank of a tool, and includes gripping means to retain the tool shank within the spindle bore; and the tool is preset away from the machine tool directly into the spindle unit without having a tool holder in the spindle unit.

The high speed spindle unit is adapted to be detachably mounted on a motorized driver with the drive shaft of the motorized driver in driving engagement with the spindle. The drive shaft and spindle are formed with mating ends which are contoured to be self-engaging and locked in driving engagement as the spindle unit mounts on the motorized driver. Means are provided on the housing of the motorized driver to lock the spindle unit in its operative position with the drive shaft and spindle coupled together.

Automatic means are provided including a spindle unit carrier or holder for selectively transporting any of a number of high speed spindle units containing cutting tools directly mounted in the spindle units without tool holders therein from a matrix to the operative position with respect to the motorized driver. The selected spindle unit is locked in the operative position with the spindle and the tool aligned and drivingly connected to the motorized driver.

By elimination of the conventional tool holder, the configuration of the spindle unit including the spindle is such that the spindle bearings may be dimensioned small in diameter, surrounding only the tool shank. In accordance with another embodiment of the invention, the spindle need be only of sufficient wall thickness to transmit torque between the drive shaft and the tool shank. The spindle unit bearings may typically be on the order of one inch in inside diameter, which permit operation of the tool at very high rotational speeds, e.g., 20,000 to 40,000 rpm, if desired. The tool retention means in the spindle is preferably an expanding sleeve which occupies little space in a radial direction and therefore does not materially affect the size of the spindle unit bearings, and which centers the tool.

The bore of the spindle is provided with a threaded stop means so that the axial position of the tool may be preset at the time the tool is mounted, away from the machine. This presetting of the tool position is necessary in many automated operations.

In high speed operation, supply of coolant or lubricant to cutter while the tool is rotating in engagement with the part is very important. Coaxial passageways in the drive shaft, the spindle and the tool are automatically interconnected as the spindle unit is mounted in operative position and liquid is supplied to the face of the tool through these passageways.

The preferred motorized driver utilized with the spindle unit is simple in design, having no draw bar or tool holder securing mechanism associated with the drive shaft. The illustrated means for securing the spindle unit to the motorized driver housing is simple in design, functioning only to clamp the stationary housing inwardly or axially of the drive shaft while the spindle and drive shaft are joined by a self-engaging coupling. This securing and clamping means when combined with the spindle unit bearings located close to the operating end of the tool provide a tool mounting having minimum eccentricity and a mounting which permits the use of small diameter bearings operating at high rotational speeds.

There are disclosed various embodiments of the spindle unit which differ in many detailed aspects but which all include a stationary housing, and a spindle supported by one or more bearings to mount a tool which is coupled through the spindle to the drive shaft of the motorized driver. One preferred embodiment includes three spindle bearings and front and rear bearing seals to prevent foreign matter and debris from a machining operation from entering the bearings. A second embodiment includes two spaced spindle bearings and utilizes a concentric sleeve locking means to secure the spindle unit to the motorized driver housing.

A third embodiment uses a single spindle bearing in combination with a spindle having a hyperboloidal configuration with the tool secured directly to the spindle as an insert. Means are provided to flex the outer end of the spindle to withdraw the tool radially with respect to the axis of rotation of the spindle. This provides a simple means of withdrawing a tool radially after boring a cylinder wall, for instance, so that the spindle and tool may be withdrawn from the bored cylinder without scoring the wall. Alternatively, the spindle may be flexed to move the tool in an outward direction for controlling the bore diameter.

The motorized driver includes a high speed motor drive which has its armature shaft coupled directly to the spindle unit to drive the spindle at speeds up to or above 40,000 rpm. The motor is provided with water cooling for both the armature and the field.

An automatic loading apparatus is combined with the motorized driver to provide automatic insertion and removal of selected spindle units into operative position. Such automatic loading apparatus are conventionally used in selection of tool holders from storage racks and in the transporting of such tool holders for coupling into a spindle socket. In the apparatus of the present invention, the automatic loading apparatus selects and transports a spindle unit from a storage area to an operative position where the stationary housing of the spindle unit is locked to the housing of the motorized driver and the spindle is simultaneously coupled to the drive shaft. The structure of the automatic loading apparatus is generally similar to that used for loading tool holders.

The spindle units are provided with means to preset the axial location of the tools with respect to the spindles. With the tool position preset, a sequence of operations may be performed by the automated apparatus to obtain a desired workpiece contour by the various tools.

The apparatus of the present invention is particularly effective in the machining of structural elements for use primarily in the aircraft industry. In these applications a wing, stabilizer, strut or the like may be machined from a solid plate with most of the core portion routed to reduce the weight while leaving thin interior webs as strengthening members. Because of the acute angles between these thin webs, relatively small diameter tools must be employed. The high speed spindle unit of the present invention permits these tools to be rotated at speeds in excess of 40,000 rpm without excessive vibration or overheating problems. Herein, the high speed of operation allows cutting of thin wall parts with smaller forces than used with conventional slower speed cutting tools. The slower speed cutting tools may apply sufficient force to deflect the thin walls where the high speed cutting tool system of this invention need not apply such a high force as would deflect a thin wall. Also, these high rotational speeds improve the surface finish on the machined parts and lessen tool deflection to produce more accurately machined parts. The replacement of the prior art tool holders with the lightweight spindle units reduces the cost of automatic tool loading apparatus and makes it possible to accomplish the tool changing more rapidly.

While the present invention is particularly important in its application to high speed cutting tool operations, it also provides significant advantages as applied to cutting processes employing more conventional speeds. These advantages include improved tool mounting rigidity, simplified spindle drives and precision concentricity in tool mounting.

Accordingly, it is an object of the present invention to provide an improved tool support for mounting a rotary cutting tool with respect to a motorized driver.

It is a further object of the present invention to provide an improved support and drive means for rotary cutting tools including a spindle unit which is detachably mounted on a motorized driver and which includes a spindle journaled in a stationary housing for connecting the tool directly to a drive shaft of the motorized driver.

It is another object of the present invention to provide a high speed rotary cutting apparatus having a plurality of spindle units which are selectively and automatically loaded into operative positions with respect to a motorized driver.

BRIEF DESCRIPTION OF THE DRAWINGS

These and other objects and advantages of the invention will become apparent from the following detailed description taken in conjunction with the accompanying drawings in which:

FIG. 7 is a sectional view of a spindle unit holder used in the automatic spindle loading apparatus of FIG. 6;

FIG. 8 is an exploded, sectional view of an alternative embodiment of a spindle unit and fragmentary portion of the motorized driver;

FIG. 9 is an elevational view partially in section of a second alternative embodiment of a spindle unit;

FIG. 10 is a front elevational view of the spindle unit of FIG. 9; and

DETAILED DESCRIPTION OF THE PREFERRED EMBODIMENTS

Figure 3:
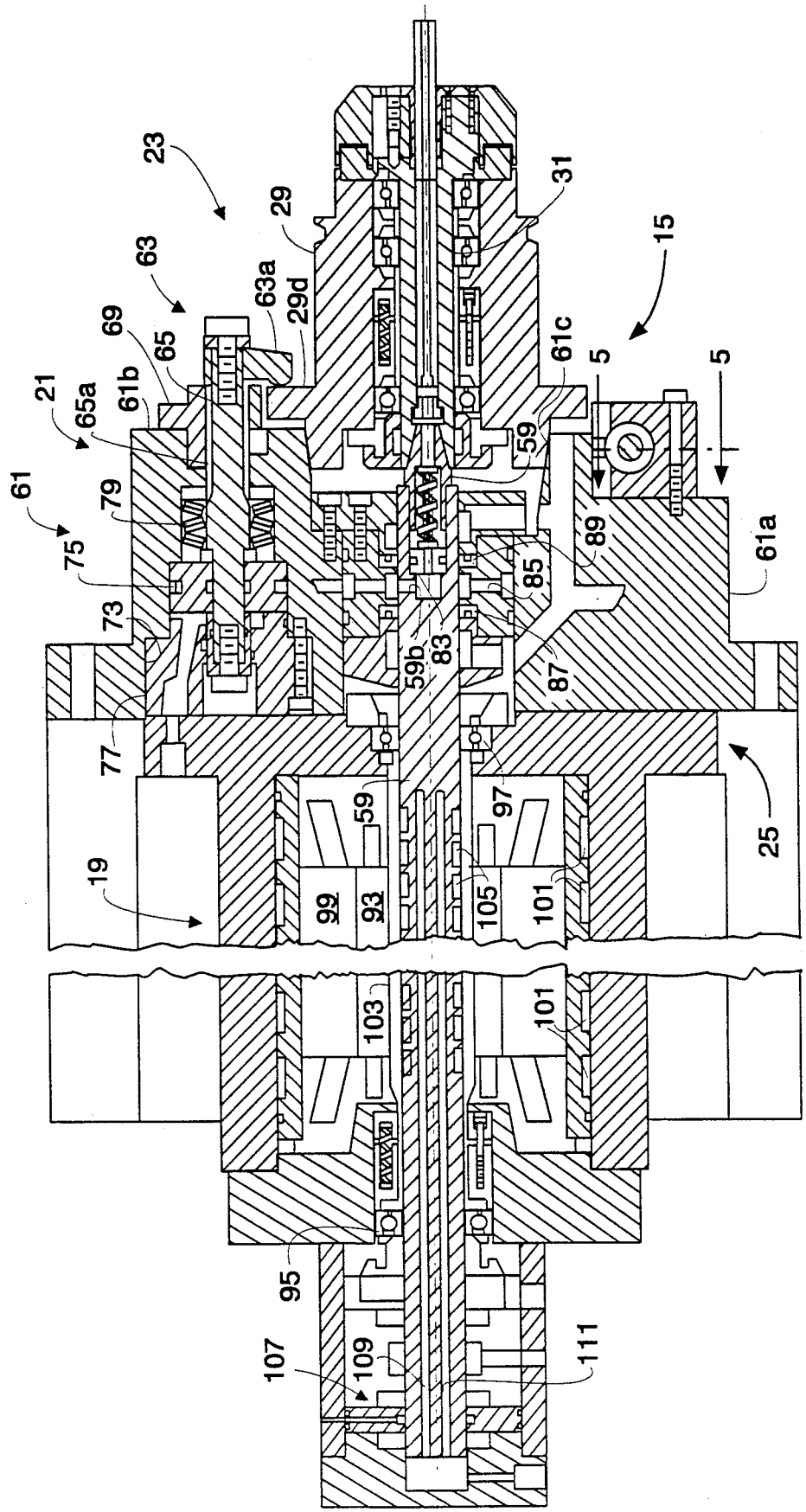
FIG. 3 a sectional view of the spindle unit and motorized driver of FIG. 2 and includes the high speed motor for driving the motorized driver.
Figure 6:
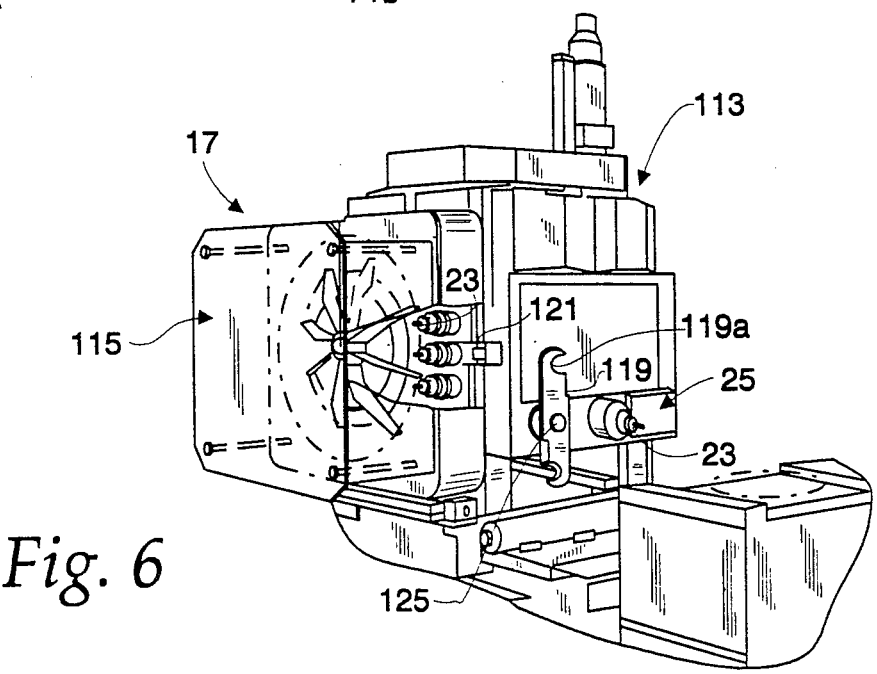
FIG. 6 is a perspective view of a motorized driver including automatic spindle unit loading apparatus in accordance with the present invention.

Referring to the drawings, there is shown in FIG. 3 a high speed spindle unit and motorized drive of the present invention designated generally by reference numeral 15. It is within the purview of the invention to utilize the high speed spindle unit and motorized drive 15 in combination with an automatic loading apparatus 17 such as, for example, is shown in FIG. 6.

The high speed spindle unit and motorized drive 15 is made up of three subassemblies including a high speed motor 19, a support and coupling section 21 and a spindle unit 23. The assembly of the motor 19 and the coupling section 21 will be referred to as motorized driver 25. As shown in FIG. 3 these subassemblies are aligned along a common horizontal axis with the motor 19 being disposed on the left, the spindle unit 23 on the right, and the support and coupling section 21 being disposed between the motor and spindle unit. It is contemplated that in the practice of the invention a plurality of spindle units would be employed to permit the successive use of a plurality of different tools each carried directly by different spindle units without any tool holder with the tools preset in their respective spindle units, which would be mounted successively on the motorized driver. The automatic loading apparatus 17 includes the means for storing such plurality of spindle units with their associated tools and means for transporting any selected one of the spindle units to an operative mounting position on the motorized driver 25. This combination of the spindle units 23 with the automatic loading apparatus 17 makes it possible to machine at very high speeds complex shapes requiring a variety of different tools.

Figure 1:
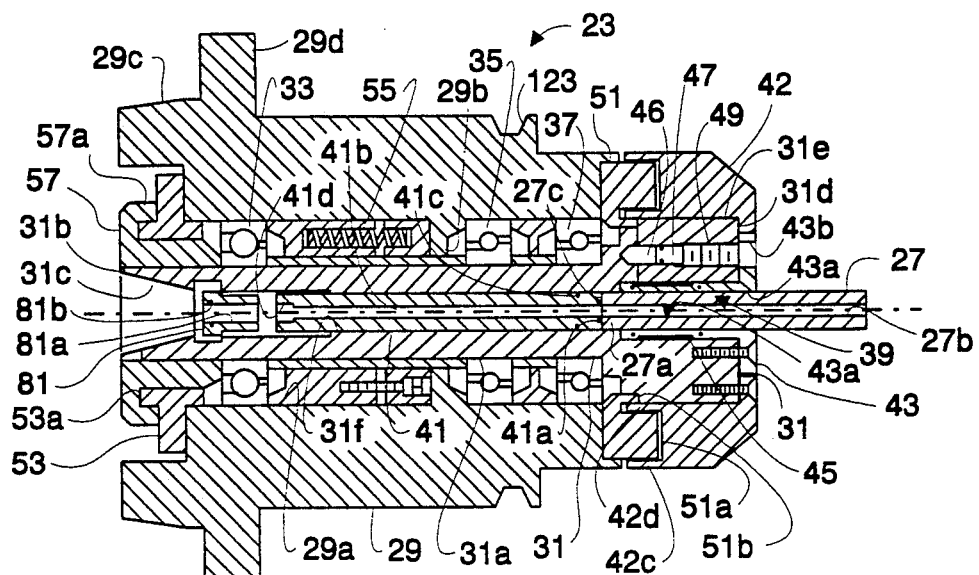
FIG. 1 is a sectional view of a spindle unit for supporting a rotary tool embodying the present invention.
Figure 2:
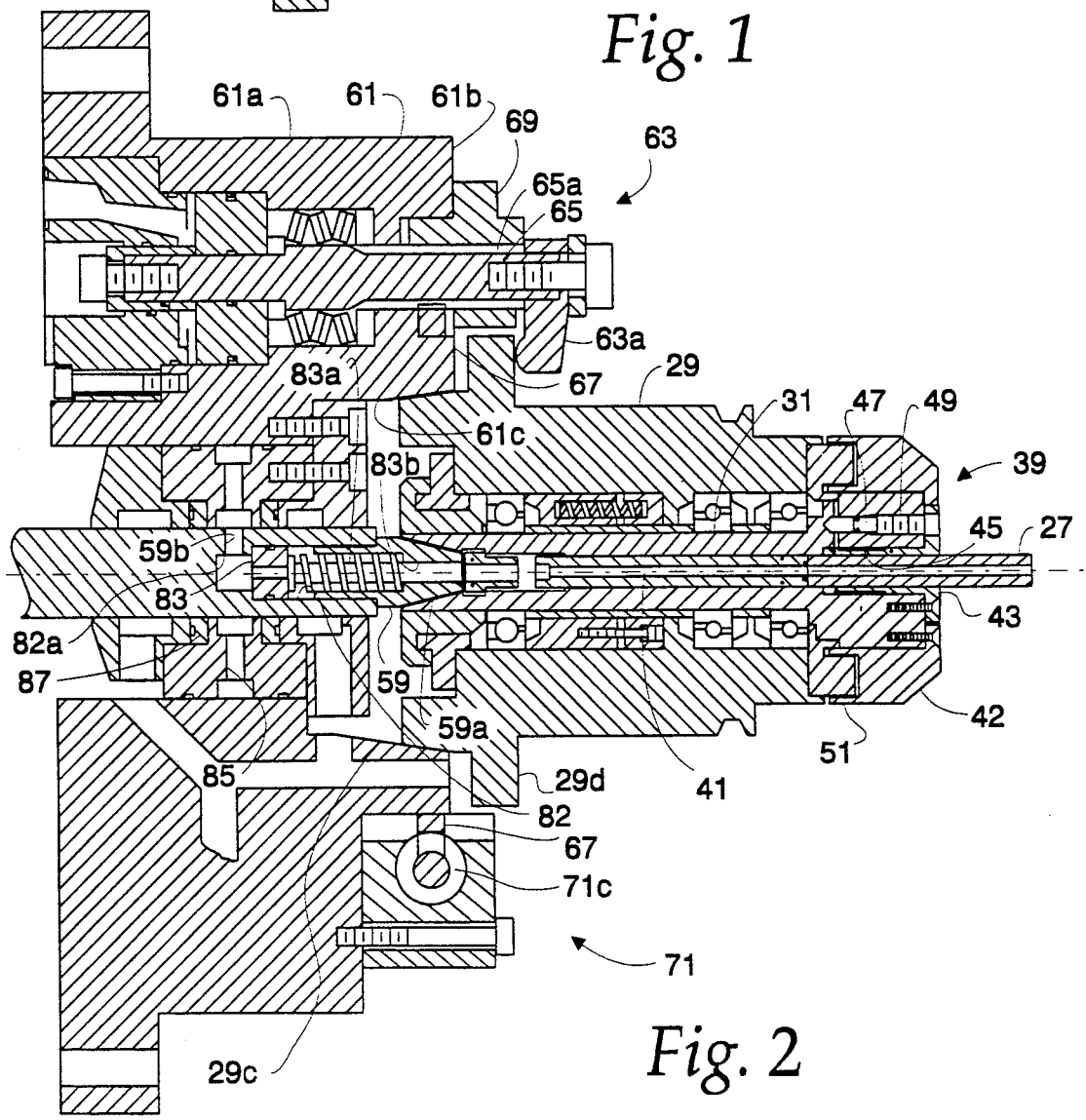
FIG. 2 is a sectional view of the spindle unit of FIG. 1 and of the motorized driver to which the spindle unit is selectively mounted.

The spindle unit 23 is shown separately in FIG. 1 and assembled to the motorized driver 25 in FIG. 2. The purpose of the spindle unit 23 is to provide a simple and lightweight means for detachably and drivingly securing a rotary tool 27 to the output or drive shaft of the motorized driver 25. The spindle unit 23 includes a generally cylindrical stationary housing 29 and a spindle 31 which is journaled for rotation in the housing 29 by ball bearings 33, 35 and 37. Although the use of ball bearings is disclosed, it is within the purview of the present invention to use alternatively any type of low-friction bearing including roller bearings, needle bearings, gas or fluid bearings or other similar bearings. The spindle 31 is formed with a cylindrical, constant diameter portion 31a which extends from an inner end 31b which is formed with a drive socket 31c to an enlarged diameter portion 31e which terminates at an outer end 31d. The portion 31e of the spindle 31 supports clamp means 39 for securing the tool 27 with respect to the spindle 31.

The spindle 31 has a central bore 31f which receives a shank portion 27a of the tool 27. The inner end of the shank portion 27a is engaged by a threaded adjustment screw 41 which serves as an adjustable stop to establish the axial position of the tool 27 within the spindle bore 31f. The interior shank of the tool terminates at an inner end 27c which is abutted by an adjacent end of the threaded adjustment screw 41. The threaded adjustment screw 41 carries an inner O-ring seal 41a abutted against the inner end 27c of the tool at the location of the juncture of an axial bore 27b in the tool and a central bore 41b in the threaded adjustment screw 41. A second, larger O-ring seal 41c seals the forward end of the threaded adjusted screw with the central bore 31f in the spindle. A recessed driving socket 41d is formed at the other end of the threaded adjustment screw to receive an Allen head wrench to turn the threaded adjustment screw that is threaded at an adjacent location into threads in the bore 31f in the spindle. It is contemplated that the tools will be preset in the spindle units in a tool room where the position of the tool tip is checked for its length of projection and for eccentricity by suitable gauges. Thus, it will be seen that the tool is preset directly in the spindle without a tool holder being present.

The inside diameter of the bearings 33, 35 and 37 are quite small, e.g., 25 mm or less, and the tool is capable of being turned about 40,000 rpm without exceeding the DN product of 1,000,000. In the illustrated embodiment of the invention, the tool is about ⅜ inch in diameter and the diameter of the entire spindle unit at the outer cylindrical wall 29 may be about 4 to 6 inches, and the spindle unit may be gripped at housing 29 and interchanged by a conventional automatic tool changer apparatus which will be changing spindle units in the manner it previously changed tool holders.

Mounted in the forward end of the bore 31f is a cap member 42 which is secured to the spindle portion 31e. Adjacent to the cap member 42 and extending within the spindle bore is sleeve 43 having a sleeve portion 43a which surrounds the shank portion 27a and forms part of the clamp means 39 for securing the tool 27 within the spindle 31. The sleeve portion 43a cooperates with a bore in the portion 31e of the spindle to form an annular enclosure or pocket 45 which is adapted to receive oil under pressure to force the sleeve portion 43a inwardly into gripping engagement with the shank portion 27a. O-rings are provided at the ends of the sleeve portion 43a to prevent oil leakage from the pocket 45.

In order to apply pressure to the oil within the pocket 45, the spindle portion 31e is formed with an L-shaped passageway 46 which connects to the pocket 45 at one end and includes a slidable piston 47 and a threaded screw 49 accessible through an opening 43b in the sleeve 43 at the other end. After the tool 27 is assembled to the spindle 31 with the shank portion 27a within the bore 31f, the screw 49 is tightened to force the piston 47 to the left as viewed in FIG. 1, thereby forcing the oil within passageway 46 into the pocket 45. This increases the pressure on the sleeve portion 43a causing it to expand inwardly, gripping the shank portion 27a.

Because of the proximity of the bearings 33, 35 and 37 to the cutting end of the tool 27, it is important that seal means be provided to prevent chips, cuttings and debris from the tool from entering the bearings. At the outer end of the spindle unit 23, there is provided a front ring 51 secured to the stationary housing 29. The front ring 51 is formed with two radially spaced annular walls 51a and 51b which cooperate with annular walls 42c and 42d on the cap member 42 to form a tortuous air passageway between the stationary portions of the spindle unit and the rotating spindle including the cap member 42. Air circulating forwardly through the ball bearings 33, 35 and 37 passes radially outwardly through the labyrinth formed by the overlapping walls 51a, 51b and 42c and 42d. The air flow and the nature of the passageway through which it passes effectively prevent any cuttings from the tool 27 from entering the bearings.

At the inner end 31b of the spindle unit 23 there is provided an inner ring 53 that forms a part of the stationary housing 29, being secured thereto within a bore or recess 29a. The inner ring 53 is formed with a flange 53a which is part of the rear bearing seal. Received on the inner end of the spindle 31 is a bearing retainer 57 which rotates in spaced relation to the inside diameter of the inner ring 53. The bearing retainer 57 is formed with a flange 57a which is somewhat L-shaped in section and which extends outwardly and around the flange 53a on the inner ring 53, to provide a rear air passageway through which air circulates inwardly to the bearing 33 and then forwardly along the spindle 31 through the bearing 35 and 37 and then radially outwardly through the labyrinth passageway. The passageway formed by the space between the bearing retainer 57 and the inner ring 53 inhibits the movement of any debris into the spindle unit bearings 33, 35 and 37.

The bearing 33 is biased into engagement with bearing retainer 57 by a plurality of coil springs 55, one of which is shown in FIGS. 1 and 2. The springs 55 are captured in opposed pockets in spaced rings to apply axial forces between a flange 29b of the stationary housing 29 and the bearing 33.

The inner end of the spindle 31 is formed with the tapered recess 31c, which may take the form of the female portion of a polygon drive, to establish a driving connection between a drive shaft 59 of the motorized driver 25. The male portion of the polygon drive is a tapered end 59a formed on the shaft 59. The engagement of the tapers on the shaft 59 and the spindle 31 assure axial alignment of the spindle 31 and drive shaft 59.

To illustrate the manner in which the spindle unit 23 is mounted on and cooperates with the motorized driver 25 and the support and coupling section 21, reference is now made to FIGS. 2 and 3. The section 21 includes a housing 61 to which the motor 19 is secured with the drive shaft 59 extending therethrough. The housing 61 is formed with a cylindrical outer wall 61a and a circular front wall 61b which is provided with a tapered or conical recess 61c designed to receive a mating conical portion 29c formed on the stationary housing 29 of the spindle unit 23. The mating tapers on the recess 61c and the portion 29c serve to align the spindle unit 23 with the spindle 31 coaxial with the drive shaft 59. Thus, as the spindle unit 23 is mounted in its operative position coupled to the motorized driver 25, the engagement between the drive shaft tapered drive portion 59a with the spindle socket 31c aligns the shaft and spindle while the recess 61c is engaged by and aligns the spindle unit with the drive shaft 59.

Figure 4:
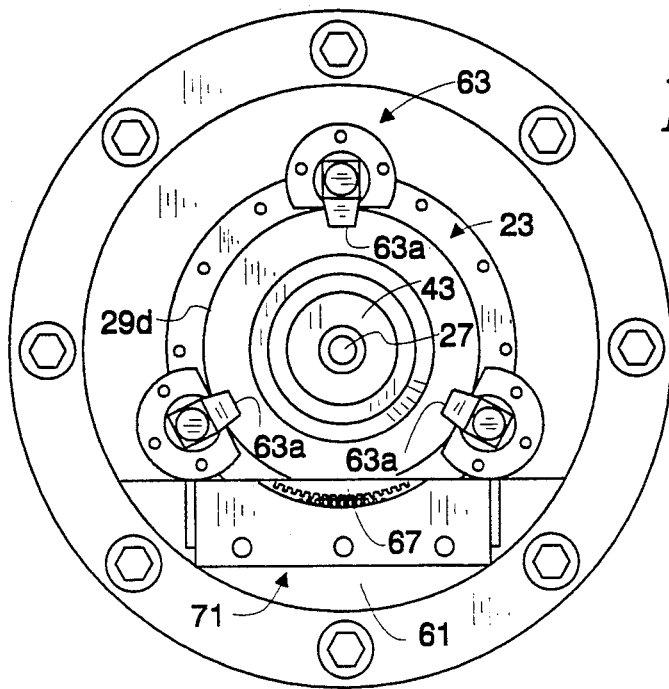
FIG. 4 is a front end view of the spindle unit and motorized driver of FIGS. 2 and 3.

In order to retain a selected spindle unit 23 in operative position with respect to the motorized driver 25, a mounting means is provided on each spindle unit and on the motorized driver with the illustrated mounting means including a clamp assembly 63 on the motorized driver. The clamp assembly 63 has three clamps 63a which exert a retaining force on an annular flange 29d which comprises the portion of the mounting means that is on the stationary housing 29 of the spindle unit 23. The clamps 63a are supported by actuators 65 for rotary movement from a position overlying the flange 29d as shown in FIGS. 3 and 4 to a displaced position allowing removal of the spindle unit 23. The actuators 65 are also movable axially to permit disengagement of the clamping force exerted on the flange 29a.

Figure 5:
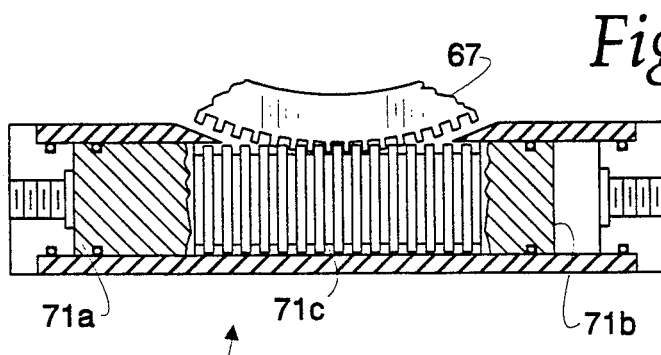
FIG. 5 is an enlarged fragmentary sectional view taken on line 5—5 of FIG. 3.

The mechanism for rotating the actuators 65 includes a ring gear 67 having teeth on its outer periphery which engage teeth or splines 65a extending lengthwise on the outer surface of the actuator 65. The ring gear 67 is mounted in an annular recess formed in the circular wall 61b and enclosed by a ring member 69. As is shown in FIGS. 3, 4 and 5, there is provided a ring gear drive 71 secured to the housing 61. The drive 71 includes a pair of hydraulic pistons 71a and 71b which are integral with and serve to drive a cylindrical gear or rack 71c which engages ring gear 67. Suitable hydraulic connections are provided to deliver hydraulic fluid to one end or the other of the drive 71 to move the rack 71c to the left or right as shown in FIG. 5, causing the ring gear 67 to be rotated clockwise or counterclockwise. Rotation of the ring gear 67 then causes the actuators 65 to move the clamps 63a into or out of their positions overlying the spindle unit flange 29d.

In connection with the mechanism for moving the actuators 65 axially, the housing 61 is formed with a plurality of cavities 73 within each of which there is mounted a piston 75 secured to each of the actuators 65. Each cavity 73 is closed by an insert 77 having a hydraulic oil passageway extending into a chamber at the face of the piston 75. Springs 79 exert a force on the actuator 65 and piston 75 urging this assembly to the left as shown in FIG. 3 causing the clamps 63a to move into clamping engagement with the spindle unit flange 29d. This clamping force is released by directing hydraulic pressure against the piston 75, thus compressing the springs 79 and releasing pressure on the flange 29d. The ring gear drive 71 may then rotate the clamps 63a to a disengaged position substantially tangential to the flange 29d whereby the spindle unit 23 may be withdrawn from the housing 61 of the motorized driver 25. This arrangement provides a fail safe mechanism wherein failure of hydraulic pressure will not release the rapidly rotating spindle. Failure of hydraulic pressure would leave the springs 79 still retaining the spindle unit 23 secured to the housing 61 by the clamps 63a.

Because of the heat generated during cutting and particularly at a high rate of rotation of the tool 27 by the motorized driver of the present invention, it is important to provide means for supplying coolant to the tool and the part being machined. As is conventional, the tool 27 is formed with axially extending bore or passageway 27b. Received within the inner end of the spindle 31, there is provided a coolant connection seal 81 which is threadedly received in bore 31f and which has a central opening 81a and a ring seal 81b. For supplying coolant from the drive shaft 59 to the spindle unit 23, the end of the drive shaft is formed with a cavity 82 in which a piston 83 is mounted for movement axially of the drive shaft 59. The cavity 82 is formed with a reduced diameter recess 82a which is at the face of the piston 83 as shown in FIG. 2. The piston 83 has a forwardly projecting conduit 83a and an axially extending opening 83b which allows coolant to pass axially through the piston and conduit 83a.

To supply cooling fluid to the drive shaft 59 there is provided a rotating seal or connection between the housing 61 and a laterally facing opening 59b formed in the drive shaft and communicating with the cavity 82. Surrounding the drive shaft 59 is an annular cavity 85 which is in continuous communication with the opening 59b as the shaft 59 rotates. To provide a seal between the rotating shaft and the housing portion defining the annular cavity 85, there are a pair of seal rings 87 and 89 secured to the housing and having very small clearance with respect to the shaft 59. O-rings are provided in the radially extending surfaces to seal against leakage between the abutting faces of the parts. The cavity 85 actually consists of two annular cavities which are connected together by radially extending passageways drilled between the two annular cavities. When the coolant fluid is supplied under pressure to the cavity 82 through the annular cavity 85 and the opening 59b, the piston 83 is forced toward the spindle unit, causing the conduit 83a to move axially into the coolant connection seal 81 so as to supply coolant to the passageway 27b in the tool 27. This results in the sealed coolant connection being made automatically as coolant supply pressure is applied on mounting a new selected spindle unit 23 in the motorized driver 25. As shown in FIG. 3, the piston 83 is in its left-most position with the coolant connection disengaged.

The motor 19 shown in FIG. 3 is secured to the support and coupling section 21 to form the motorized driver 25. The motor is enclosed by a housing 91 which is secured to the housing 61 of the section 21. The motor 19 includes an armature or rotor 93 which is supported by the drive shaft 59 having rear and forward ball bearings 95 and 97 respectively. Surrounding the armature 93 is a water cooled stator 99. As shown in FIG. 3 the jacket surrounding the stator 99 is provided with peripherally extending passageways 101 through which water is circulated to cool the stator. Similarly, the drive shaft 59 is provided with a sleeve 103 within which the outer surface of the shaft is formed with passageways 105 for circulating cooling water. At the left end of shaft 59 as viewed in FIG. 3, the motor 19 is provided with a rotary seal 107 for delivery cooling water to a lengthwise extending passageway 109. A second lengthwise extending passageway 111 is connected to carry the return water to a second rotary seal at the end of the shaft 59. The water cooling of both the armature and the field allows the motor 19 to be operated at high speeds up to 40,000 rpm.

There is shown in FIG. 6 of the drawings an automatic loading apparatus 17 which is adapted to load and unload selected spindle units 23 to a motorized driver 25, shown with a spindle unit 23 attached. As depicted in FIG. 6, the motorized driver 25 is supported by universal transfer apparatus 113 which moves the motorized driver 25 vertically, axially or laterally of the drive shaft 59 in order to perform drilling, boring or milling operations.

There are many known types of automatic tool changing apparatus that have been used to load and unload tools mounted in a tool holder. Such apparatus is applicable to the loading and unloading of the spindle units of the present invention. Examples of such known automatic tool changing apparatus are included the following United States Patents: Andersen U.S. Pat. No. 3,811,179; Narushima et al. U.S. Pat. No. 4,084,300; Satah et al. U.S. Pat. No. 4,343,077; Peiser et al. U.S. Pat. No. 4,312,111; Hagree et al. U.S. Pat. No. 4,335,498; Reed U.S. Pat. No. 4,196,506; and Zankle et al. U.S. Pat. No. 4,358,888.

The automatic loading apparatus 17 includes means for storing a plurality of spindle units for selective use with the motorized driver 25. This storing means comprises a carousel 115 which is adapted to store a plurality of spindle units and to move a selected one to a transfer position for loading to the driver 25. The carousel 115 is rotatable about a horizontal axis having peripherally spaced mounting means to detachably support spindle unit holders 117, one of which is shown in section in FIG. 7. Each holder 117 is generally cylindrical in shape having a sidewall 117a and an inwardly directed flange 117b which terminates in an opening 117c. The holder 117 is dimensioned to receive and partially enclose the spindle unit 23 as shown in FIG. 7. A suitable latch or detent means (not shown) is provided to retain the spindle unit 23 positioned within the holder 117 until extracted by a transfer arm 119.

The holder 117 has formed on sidewall 117a a first annular groove 117d which is engaged by the carousel 115 to support the holder 117 therein. A transfer shuttle 121 is mounted adjacent to the carousel 115 and is adapted to move a holder 117 from a transfer position to a pick-up position where it may be removed by the transfer arm 119. The shuttle 121 shifts the holder horizontally and rotates it 90° about a vertical axis so that the spindle unit and its tool 27 are oriented with the tool axis parallel to the drive shaft 59 of the motorized driver 25. The shuttle 121 has a portion that engages a second annular groove 117e on the holder 117, thereby permitting the shuttle to remove the holder 117 from the carousel and transfer it to the position in which the spindle unit may be picked up by the transfer arm 119.

The preferred spindle unit is formed with an annular groove 123 which is adapted to receive one of two hook shaped ends 119a formed on the transfer arm 119. The transfer arm 119 is rotatable to engage the end 119a with the groove 123 in the spindle unit 23. The transfer arm 119 is mounted on a shaft 125 which is movable axially in order to remove the spindle unit 23 from the holder 117. The transfer arm 119 then is rotated about the shaft 125 to position the spindle unit 23 in axial alignment with the drive shaft 59. The shaft 125 is then moved axially inwardly to position the spindle unit 23 in the operative position shown in FIG. 2, where it is locked to the housing of the motorized driver 25. The spindle unit 23 may be automatically unloaded from the motorized driver 25 by the transfer arm 119 which places the spindle unit 23 back in the holder 117 in the transfer shuttle 121 which moves the holder 117 and spindle unit 23 back to the carousel 115.

In performing an automatic sequence of operations using various tools 27, each supported in its respective spindle unit 23, the spindle units are loaded in holders 117 that are mounted in the peripherally spaced positions in the carousel 115. The automatic loading apparatus 17 indexes the carousel to the transfer position for a particular tool, where the transfer shuttle 121 removes the holder 117 with its spindle unit 23 from the carousel and shifts it to the position in which transfer arm 119 removes the spindle unit 23 from its holder 117 and engages the spindle unit 23 to the motorized driver 25. Upon completion of the machining operation with the first selected tool, it is removed and automatically replaced with another mounted in its respective spindle unit. In this manner, the sequence of operations using the spindle units 23, in lieu of the tool holders of the prior art machines, is accomplished automatically with the loading apparatus 17. The use of the spindle units in lieu of the tool holders of the prior art provides advantages both in the design and construction of the automatic loading apparatus as well as the improved operation of the tool with respect to the motorized driver, allowing operation at higher speeds than were heretofore possible with the high mass tool holders of the prior art. The spindle units of the present invention are small and light in weight because they do not have a large conventional tool holder therein. The spindle units, because of the lessened size and weight of the assembly, may be transferred by the automatic loading apparatus, thereby reducing the cost and complexity and permitting more rapid cycling of the apparatus. There are a wide variety of other loading and storage means that can be employed in a manner similar or identical to those in common use today for loading and storing conventional tool holders.

The lesser mass that is rotated with the tool permits faster acceleration of tools to their operating speeds with a resulting improvement in machine efficiency. Finally, the provision of a bearing support for the spindle which is small in diameter and located close to the loading point on the tool permits operation at high rotational speeds with little vibration or chatter in the tool.

There is shown in FIG. 8 of the drawings an alternative embodiment of the spindle unit of the present invention. A spindle unit 131 is shown in spaced relationship to its motorized driver 133. The spindle unit 131 includes a stationary housing 135 and a spindle 137 supported by spaced ball bearings 139 and 141. A rotary cutting tool 143 is received within an axial bore 137a in the spindle 137 and an expanding sleeve 145 is positioned within the bore 137a to grip the shank of the tool 143. An oil filled passageway 147 is connected to the expanding sleeve 145 and is provided with screw controlled means to force oil into the sleeve 145 to grip the tool shank.

The motorized driver 133 includes a drive shaft 149 driven by a high speed motor to operate at high speeds of on the order of 20,000 to 40,000 rpm. In order to couple the drive shaft 149 to the spindle 137, the drive shaft and spindle ends are formed with tapered polygon drive elements 149a and 137b which align the shaft and spindle and drivingly couple the parts together. To retain the spindle unit 131 in position with the drive shaft engaged with the spindle 137, the motorized driver 133 is provided with an expanding sleeve 151 in a cylindrical recess 153 in housing 155. The stationary housing 135 includes an annular flange 135a which fits into the recess 153 and is gripped by the sleeve 151 when oil pressure is applied between the sleeve and the wall of the recess 153.

The bore 137a of the spindle 137 is threaded to receive the adjustable tool stop 157 which is provided to permit the adjustment or presetting of the axial location of the tool 143 with respect to the spindle 137. The stationary housing 135 is formed with a peripheral flange 159 having a channel 161 to permit transfer of the spindle unit 131 by the transfer arm 119, as described above in connection with the automatic loading apparatus 17.

The spindle unit 131 of the embodiment of FIG. 8 is similar in many respects to the embodiment of FIGS. 1-5, differing primarily in the manner of support with respect to the motorized driver and having two rather than three bearings. However, the concept of having the lightweight tool supporting spindle unit using small diameter bearings to support a spindle which has a self-aligning connection to the drive shaft of the motorized driver is the same in both embodiments. The lightweight spindle unit may be easily handled by the transfer mechanism in an automatic loading apparatus 17.

Shown in FIGS. 9 and 10 of the drawings is a third embodiment of the invention which involves a spindle unit 165 to support a spindle 169 with respect to a stationary housing 171. By utilizing a spindle 169 having a very limited length in the axial direction, it is possible to accommodate the load applied by the tool in a single bearing. The spindle 169 has an outer tool support ring 169a, a bearing mounting ring 169b and a drive coupling hub 169c. The tool support ring 169a has a recess to support a cutting tool 173 which is adapted to finish an inside diameter of a hole such as a cylinder bore.

The portion of the spindle 169 between the ring 169a and the ring 169b is a hyperboloid sleeve 169d. The load applied to the cutting tool 173 has a resultant force which is offset from the axis of the spindle and directed inwardly as indicated by the dashed line 'A'. The hyperboloid form of the sleeve 169d may be described as the locus of these resultant force or load lines as the tool rotates. The load is into the bearing 167, producing little or no twisting moment in the spindle transverse to the spindle axis. The resultant loads are in the shape of a hyperboloid and the wall of the sleeve 169d is formed as a hyperboloid to support the tool and to withstand these resultant forces. The additional metal that is used for a conventional cylindrical housing wall is not needed and is not present, thereby making a smaller mass to be rotated at high speed. The hyperboloid sleeve wall 169d may be made so thin that the sleeve wall 169d and the tool supporting ring 169a may be flexed from its circular shape to an elliptical shape.

In order to withdraw the tool 173 inwardly toward the axis of rotation of spindle 169 there is provided a diametrically extending yoke 175 which extends across the inside diameter of the tool support ring 169a along a line perpendicular to the radial line to the tool 173. In the inactive position of yoke 175, it is bowed as shown in the top sectioned view of FIG. 9; and in the operative position, it is straight as shown in the lower sectioned view of FIG. 9. An axially disposed actuator 177 is coupled to the yoke 175 to move the yoke from the inactive position in which the ring 169a is circular to the active position in which the ring 169 is deformed to an elliptical configuration with the yoke extending across the major axis. As thus deformed, the tool 173 lies along the minor axis and is withdrawn inwardly from its position with the ring 169a undeformed.

Alternatively, the cutting insert can be placed along the major axis of deflection. By controlling the amount of deflection, the insert can be flexed outwardly to adjust the final bored diameter. The inactive position therefore produces a smaller diameter rotational path for the tool, permitting it to be withdrawn from the finished bore.

The spindle unit 165 is particularly useful in applications in which an internal recess is to be bored, as for example, the inside diameter of a cylinder wall. With the novel design of the spindle unit 165, the cutter 173 may be moved inwardly to finish an interior cylindrical surface and when the cutting is complete, the ring 169a may be made elliptical by the yoke 175 and actuator 177 withdrawing the tool 173 radially. The spindle may then be withdrawn with the tool 173 without scoring the finished internal surface.

Figure 11:
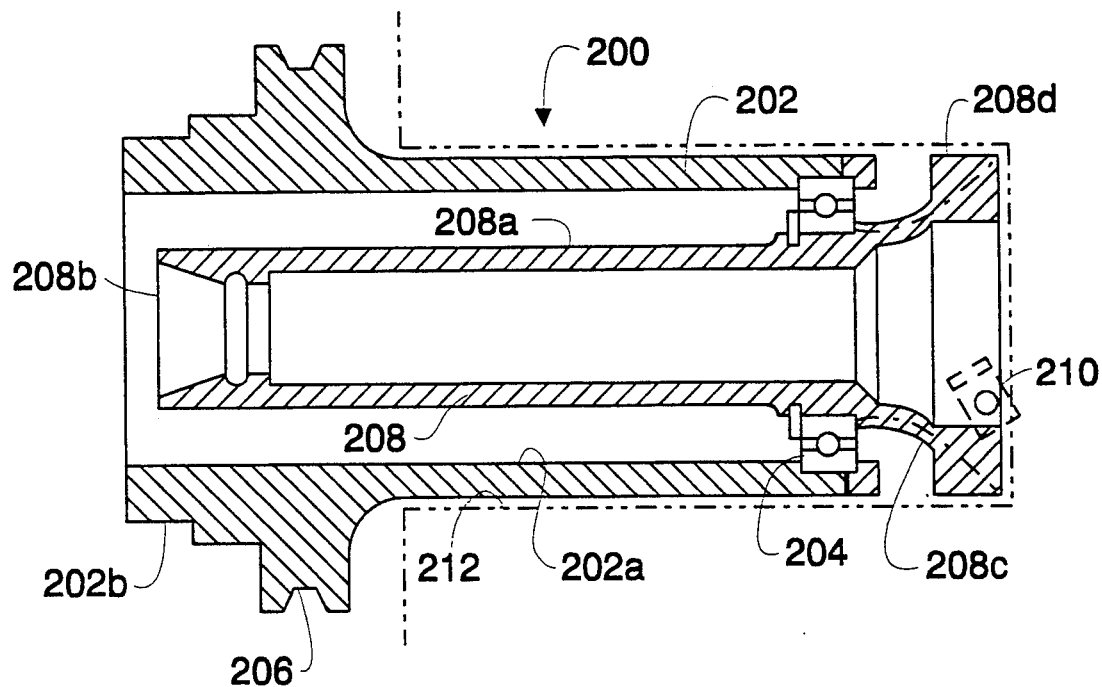
FIG. 11 is a sectional view of a third alternative embodiment of a spindle unit.

A further embodiment of the invention is shown in FIG. 11. This embodiment is a variation of the embodiment of FIGS. 9 and 10 in that it includes a hyperboloid sleeve configuration for the spindle sleeve. A spindle unit 200 is shown as including an elongated stationary housing 202 having a central bore 202a within which a ball bearing 204 is supported. The housing 202 is formed with a cylindrical mounting portion 202b which adapts the spindle unit 200 for mounting with respect to a motorized driver. A peripheral flange 206 is provided to permit the spindle unit to be loaded and unloaded by an automatic loading apparatus 17.

The spindle unit bearing 204 supports for rotation a spindle 208 which has an elongated body portion 208a terminating at its inner end at a female drive coupling socket 208b. At the outer end of the spindle 208, it is formed with a hyperboloid sleeve portion 208c having a ring 208d supporting at least one insert tool 210. The tool 210 is received in a pocket in the rim 208d and would function as the tool 173 described in connection with the embodiment of FIGS. 9 and 10. A mechanism similar to that shown for the embodiment of FIGS. 9 and 10 could be employed to move the tool 210 radially with respect to the spindle.

The elongated configuration of the spindle unit 200 adapts it to boring deeper holes as might be required in connection with internal combustion engine cylinder walls. Shown in dashed lines in FIG. 11 is the outline of a bored cylinder wall 212. It is also noted that hyperboloid sleeve 208c has a configuration that permits use of a smaller diameter bearing 204 than the bearing employed in the embodiment of FIGS. 9 and 10.

It is also contemplated that the spindle unit 165 or 200 may employ multiple insert tools mounted around the periphery of the spindle to be used for boring and milling. With such multiple inserts, there would be no use of the wall flexing feature. The embodiment of FIGS. 9 and 11 differ from the other embodiments in the manner in which the tool is supported by the spindle and the manner in which the spindle is carried by the stationary housing 171. However, the concept of journaling the spindle in a stationary housing carried by the housing of the motorized driver is common to all of the embodiments disclosed herein. It should be understood that the number and location of bearings required to journal the spindle with respect to the stationary housing portion of the spindle unit is not critical to the practice of the invention. Similarly, various alternatives may be employed to mount the stationary housing of the spindle unit with respect to the motorized driver. With the spindle unit bearings being positioned outboard of the end of the drive shaft of the motorized driver and close to the point of application of the load to the cutting tool, the alignment of the tool and the drive shaft becomes much less critical and any minor eccentricity is less likely to cause any problems. The alignment of the tool and the spindle with the drive shaft through use of a self-aligning coupling further minimizes any eccentricity problems.

While the major advantage of the present invention in permitting use of very high rotational speed machining may not be obvious from the limited examples disclosed, it should be appreciated that the present invention provides a means for minimizing bearing sizes and thus permitting operation at high rotational speeds with reasonable linear speeds in the spindle bearings. The spindle units are relatively inexpensive and may be made in various sizes to minimize bearing diameters to receive the tool shanks and spindles. The spindles themselves are sleeves required only to receive the tool shank and provide enough wall thickness to transmit the tool load to the bearings and the drive shaft. As a result the spindle bearings need not be much larger in inside diameter than the diameter of the tool shank. In the embodiments of FIGS. 1 and 8, the bearings were approximately twice the diameter of the tool shank. In contrast, the spindle bearings of the prior art were far greater in diameter or located so far from the cutting load as to introduce the balance and eccentricity problems discussed above.

It is noted that even with the embodiment of FIG. 9, the diameter of the spindle bearing is small as compared to the diameter of the hole or bore being machined. The size of the bearing in the embodiment of FIG. 9 is dictated by the resultant of the cutting forces and had to be along the base of the hyperboloidal sleeve that was determined by the resultant force vectors on the cutting tool. Only with the spindle unit design of the present invention would it be practical to use the hyperboloidal spindle design for a tool support.

The present invention has been described as being a high speed spindle unit, and that is its main advantage, particularly when used with automatic changing apparatus. However, the present invention is not limited to only high speed use, because it is possible to run these same spindle units at lower speeds than high speeds, for example, running the spindle unit tools at 8,000 to 10,000 rpm rather than at speeds of 20,000 to 40,000 rpm. Although the invention has been described with respect to various embodiments, it will be understood that there is no intent to limit the invention by such disclosure, but rather it is intended to cover all modifications and alternative constructions falling within the spirit and scope of the invention as defined in the appended claims.

What is claimed is:

1. A spindle unit for automatic mounting and dismounting in a motorized driver having a drive shaft rotatable about a driven shaft axis, said spindle unit comprising:
    an outer stationary housing having a tool receiving end and a driver mounting end;
    cooperating means on the housing for cooperating with automatic means to remove the spindle unit from storage, and for placing the spindle unit in the motorized driver;
    a rotatable spindle rotatably mounted in the stationary housing for rotation about a spindle axis coaxial with the drive shaft axis and for supporting a cutting tool for rotation;
    a single cutting tool preset and preinstalled in the rotatable spindle and rotatable about the axis of the drive shaft and the spindle axis;
    bearing means in the stationary housing mounting the spindle for rotation in the stationary housing and thereby supporting the cutting tool for rotation within the stationary housing;
    said bearing taking axial and radial loads from the tool and being sized to the preset and preinstalled tool;
    said bearing means including a bearing positioned in the tool receiving end of the stationary housing and radially adjacent the tool shank and proximate the tool cutting edge;
    said cutting tool being mounted in the spindle without an adapter on the tool and without a rotating retention device gripping the adapter for the tool within the spindle unit;
    a drive coupling on the spindle having a driving connection with the drive shaft to rotate the spindle and cutting tool; and
    means non-rotatable with the spindle on the spindle unit for cooperation with the motorized driver to mount the spindle unit coaxially with the drive shaft of the motorized driver.

2. A spindle unit in accordance with claim 1 in which the housing includes an outer body with a hollow bore, and in which the bearing means comprises at least one bearing mounted in the bore and in which the spindle comprises an elongated shaft with a central opening in which is mounted the tool.

3. A spindle unit for automatic mounting and dismounting in a motorized driver having a driving shaft rotatable about a drive shaft axis, said spindle unit comprising:
    an outer stationary housing;
    cooperating means on the housing for cooperating with automatic means to remove the spindle unit from storage, and for placing the spindle unit in the motorized driver;
    a rotatable spindle rotatably mounted in the stationary housing and supporting a cutting tool for rotation;
    a cutting tool preset in the rotatable spindle and rotatable about the axis of the drive shaft;
    bearing means mounting the spindle for rotation in the stationary housing and thereby supporting the cutting tool for rotation within the stationary housing;
    a drive coupling on the spindle having a driving connection with the drive shaft to rotate the spindle and cutting tool;
    means non-rotatable with the spindle on the spindle unit for cooperation with the motorized driver to mount the spindle unit coaxially with the drive shaft of the motorized driver; and the spindle including a body having a thin shell section having substantially the shape of a hyperboloid, the cutting tool being mounted on an outer rim on the body.

4. A spindle unit for automatic mounting and dismounting in a motorized driver having a drive shaft rotatably about a drive shaft axis, said spindle unit comprising:

an outer stationary housing;

cooperating means on the housing for cooperating with automatic means to remove the spindle unit from storage, and for placing the spindle unit in the motorized driver;

a rotatable spindle rotatably mounted in the stationary housing and supporting a cutting tool for rotation;

a cutting tool preset in the rotatable spindle and rotatable about the axis of the drive shaft;

bearing means mounting the spindle for rotation in the stationary housing and radially adjacent the cutting tool thereby supporting the cutting tool for rotation within the stationary housing;

a drive coupling on the spindle having a driving connection with the drive shaft to rotate the spindle and cutting tool;

means non-rotatable with the spindle on the spindle unit for cooperation with the motorized driver to mount the spindle unit coaxially with the drive shaft of the motorized driver; and the cutting tool rotating at a velocity in excess of 20,000 rpm, the inside diameter of the bearings being about 50 millimeters or less so that the DN product when multiplied by the velocity in revolutions per minute does not exceed approximately 1,000,000.

5. A spindle unit in accordance with claim 1 in which the spindle comprises a rotatable shaft having a hollow end rotating in the bearing means, and an expandable and contractible sleeve is positioned in the hollow end of the rotatable shaft for gripping the cutting tool tightly and providing concentricity of alignment of the cutting tool on the spindle and drive shaft axis.

6. A spindle unit in accordance with claim 1 in which the spindle is a rotatable member having a central bore coaxial with the drive shaft axis, and in which the cutting tool is mounted in the bore to turn about the drive shaft axis.

7. A spindle unit for automatic mounting and dismounting in a motorized driver having a drive shaft rotatably about a drive shaft axis, said spindle unit comprising:

an outer stationary housing;

cooperating means on the housing for cooperating with automatic means to remove the spindle unit from storage, and for placing the spindle unit in the motorized driver;

a rotatable spindle rotatably mounted in the stationary housing and supporting a cutting tool for rotation;

a cutting tool preset in the rotatable spindle and rotatable about the axis of the drive shaft;

bearing means mounting the spindle for rotation in the stationary housing and thereby supporting the cutting tool for rotation within the stationary housing;

a drive coupling on the spindle having a driving connection with the drive shaft to rotate the spindle and cutting tool;

means non-rotatable with the spindle on the spindle unit for cooperation with the motorized driver to mount the spindle unit coaxially with the drive shaft of the motorized driver; and an outer shell wall on the spindle of substantially hyperboloid shape to reduce mass of the spindle and to contain cutting forces.

8. A spindle unit in accordance with claim 7 in which the cutting tool comprises at least one cutting insert which is mounted on the outer end of the shell at a location spaced from the drive shaft axis.

9. A spindle unit in accordance with claim 7 including means to deflect the shell wall to shift the insert in a radial direction relative to the drive shaft axis.

10. A spindle unit in accordance with claim 1 in which the drive coupling includes a conical surface for mating with a conical surface on the drive shaft to reduce eccentricity of the rotation of the spindle and cutting tool about the axis of the drive shaft.

11. In a rotatable machine tool of the type having a driving head, a plurality of detachable rotary cutting tools and automatic means for selectively mounting and dismounting individual ones of said cutting tools with respect to said driving head, the combination comprising:

a motorized drive head including a motor and a drive shaft which is driven by the motor and is rotatable about a drive shaft axis;

a plurality of spindle units, each spindle unit having a stationary outer housing, an internal rotatable spindle rotatable coaxially about the drive shaft axis, and a single cutting tool preset and preinstalled on the spindle for rotation about a spindle axis; said tools being mounted in their respective spindles without an adapter on the tool and without a retention device for the tool adapter;

bearings in each spindle unit being located radially adjacent its associated tool to keep the diameter (D) for the bearings small to minimize the linear speed thereof for a selected tool speed, mounting means non-rotatable with the spindle on said stationary housing and on each spindle unit to detachably retain any selected one of said spindle units on said drive head with said spindle axis aligned with said shaft axis; said mounting means being non-rotatable with the spindle;

a drive coupling engaged upon assembly of any selected one of said spindle units to said drive head to connect said shaft to the spindle and cutting tool of the selected spindle unit;

storage means for storing said plurality of spindle units each with a single tool adjacent to said motorized drive head; and automatically controlled mechanical transport means transporting any selected one of said spindle units from said storage means and mounting said selected spindle unit on said drive head with said drive shaft driving the cutting tool of the selected spindle unit.

12. The machine tool of claim 11 wherein each spindle includes a bore within which a supporting shank of the cutting tool is slidably received;

spaced bearings mounted in said spindle unit to support said spindle for rotation with respect to said stationary outer housing;

said drive coupling including cooperating means on said drive shaft and spindle to rotate said spindle and the cutting tool mounted thereon.

13. A rotating machine tool having means for selectively driving any one of a plurality of rotary cutting tools at high speed, comprising:
  a motorized driver including a motor enclosed in a housing driving a drive shaft having an output end extending from said housing, said shaft having an axis about which it rotates;
  a plurality of cutting tool adaptors for detachably mounting rotary cutting tools for selective driving engagement with said drive shaft, each said adaptor including an outer non-rotatable support having a central bore in which a tool-receiving sleeve is mounted for rotation on spaced bearings secured to said support within said bore;
  means for securing each tool adaptor to said housing with the axis of said sleeve coaxial with said shaft axis;
  a drive coupling on said shaft and each said sleeve engaged upon mounting one of said tool adaptors on said housing to drivingly connect said shaft and said sleeve, said sleeve having a recess for receiving a mounting portion of a rotary machine tool, said recess being formed to transmit torque from said sleeve to said mounting portion; and
  said means for securing each adaptor to said housing includes a cylindrical coupling recess formed in said housing; said cylindrical coupling recess having an axis which is coincident with said shaft axis, and an expanding ring secured within said cylindrical coupling recess to grip an annular shoulder of one of said tool adaptors to secure such tool adaptor to said housing.

14. In a rotatable machine tool of the type having a driving head, a plurality of detachable rotary cutting tools and automatic means for selectively mounting and dismounting individual ones of said cutting tools with respect to said driving head, the combination comprising:
  a motorized drive head including a motor for driving a drive shaft which is rotatable about a drive shaft axis;
  a plurality of spindle units, each spindle unit having a stationary outer housing, an internal rotatable spindle, and a cutting tool preset on the spindle for rotation about a spindle axis;
  mounting means non-rotatable with the spindle on said housing and on each spindle unit to detachably retain any selected one of said spindle units on said drive head with said spindle axis aligned with said shaft axis;
  a drive coupling engaged upon assembly of any selected one of said spindle units to said drive head to connect said shaft to the spindle and cutting tool of the selected spindle unit;
  storage means for storing said plurality of spindle units adjacent to said motorized drive head; pl automatically controlled mechanical transport means transporting any selected one of said spindle units from said storage means and mounting said selected spindle unit on said drive head with said drive shaft driving the cutting tool of the selected spindle unit; and
  an outer shell wall on the spindle of substantially hyperboloid shape to reduce mass of the spindle to contain cutting forces exerted on said cutting tool.

15. The machine tool in accordance with claim 14 in which at least one cutting insert is mounted on the outer end of the shell at a location spaced from the drive axis.

16. The machine tool in accordance with claim 15 including means to deflect the shell wall to shift the insert radially inward to provide clearance space to withdraw the insert and shell without scarring a previously machined bore or to shift the insert radially outward to a maximum cutting diameter.

17. An apparatus for driving a rotating cutting tool comprising:
  a motorized driver including a motor enclosed in a housing and driving a drive shaft in the housing and having an output end, said shaft having an axis about which it rotates;
  a spindle unit having bearings radially adjacent the tool for journaling a tool-receiving sleeve for rotation about a spindle axis which is coaxial with the axis of the drive shaft;
  mounting means on said housing and said spindle unit to detachably retain said spindle unit on said housing with said spindle axis aligned with said shaft axis, said mounting means being non-rotatable with the sleeve;
  a spindle journaled in the bearings and carrying one or more cutting tools for rotation about the spindle axis;
  a single cutting tool having a maximum diameter without a tool changing adapter thereon with the tool being preset and preinstalled in said sleeve of the spindle;
  adapter means on the spindle unit for use with an automatic transport means to change a spindle unit each time a tool is changed;
  the bearings in the spindle having a reduced diameter related to the tool maximum diameter of the tool to allow an increase in tool cutting speed and a decrease in the linear speed of the bearings; and
  a drive coupling on said shaft and said spindle engaged upon assembly of said spindle unit to said housing to connect said shaft and said spindle.

18. Apparatus for driving a rotating cutting tool as recited in claim 17 wherein said spindle is in the form of a hollow tool-receiving sleeve;
  said drive coupling between said shaft and said tool-receiving sleeve having male and female axially engaging parts which align said sleeve axis with said shaft axis.

19. Apparatus for driving a rotating cutting tool as recited in claim 17 wherein said mounting means includes a conical recess formed in said housing coaxial with said drive shaft and a tapered shoulder on said spindle unit received within said recess, and releasable clamping means on said housing engageable with said spindle unit to retain said tapered shoulder engaged in said recess.

20. Apparatus for driving a rotating cutting tool as recited in claim 19 wherein said clamping means includes a plurality of spring biased clamps which are selectably engageable with said spindle unit to bias said spindle unit against said housing, and hydraulic means for displacing said clamps in opposition to the spring biasing to disengage said clamps from said spindle unit.

21. An apparatus for driving a rotating cutting tool comprising:
  a motorized driver including a motor enclosed in a housing and driving a drive shaft in the housing and having an output end, said shaft having an axis about which it rotates;

a spindle unit having bearings for journaling a tool-receiving sleeve for rotation about a spindle axis which is coaxial with the axis of the drive shaft;

mounting means on said housing and said spindle unit to detachably retain said spindle unit on said housing with said spindle axis aligned with said shaft axis;

a spindle journaled in the bearings and carrying one or more cutting tools for rotation about the spindle axis;

a cutting tool preset and preinstalled in said spindle;

a drive coupling on said shaft and said spindle engaged upon assembly of said spindle unit to said housing to connect said shaft and said spindle; and said mounting means including a cylindrical recess formed in said housing coaxial with said drive shaft and an annular shoulder on said spindle unit received within said recess, and an expanding ring fixed to said housing in said recess to grip said annular shoulder and secure said spindle unit to said housing.

22. Apparatus for driving a rotating cutting tool as recited in claim 17 wherein said spindle is in the form of a rotatable shaft having a hollow interior bore to receive the cutting tool;

said spindle unit including a cylindrical stationary housing having an internal bore, said bearings for journaling said spindle being axially spaced in said bore at opposite ends thereof.

23. Apparatus for driving a rotating cutting tool as recited in claim 21 wherein said drive connection between said spindle shaft and said tool shank comprises means to lock said shank and said shaft against relative rotation and an expanding ring secured to the interior of said spindle shaft to grip said tool shank and restrain said shank from axial movement relative to said spindle shaft.

24. An apparatus for driving a rotating cutting tool comprising:

a motorized driver including a motor enclosed in a housing and driving a drive shaft in the housing and having an output end, said shaft having an axis about which it rotates;

a spindle unit having bearings radially adjacent the tool for journaling a tool-receiving sleeve for rotation about a spindle axis which is coaxial with the axis of the drive shaft;

mounting means non-rotatable with the shaft on said housing and said spindle unit to detachably retain said spindle unit on said housing with said spindle axis aligned with said shaft axis;

a spindle having a hollow bore journaled in the bearings and carrying one or more cutting tools for rotation about the spindle axis;

a cutting tool preset and preinstalled and telescoped within the hollow bore in said spindle;

a drive coupling on said shaft and said spindle engaged upon assembly of said spindle unit to said housing to connect said shaft and said spindle; and said drive shaft being rotated at high speed, drive shaft bearings in said housing supporting said drive shaft for rotation, said spindle bearings being no greater in diameter than said drive shaft bearings, the spindle bearings being related in size to the tool without a tool adapter thereon to allow the spindle bearings to have a small diameter to minimize the linear speed of said spindle bearings for a selected tool rotational speed.

25. A rotating machine tool having means for selectively driving any one of a plurality of rotary cutting tools at high speed, comprising:

a motorized driver including a motor enclosed in a housing driving a drive shaft having an output end extending from said housing, said shaft having an axis about which it rotates;

a plurality of cutting tool adaptors for detachably mounting rotary cutting tools for selective driving engagement with said drive shaft, each said adaptor including an outer non-rotatable support having a central bore in which a tool-receiving sleeve is mounted for rotation on spaced bearings secured to said support within said bore, at least one of said spaced bearings being radially adjacent said tool;

means non-rotatable with the sleeve for securing each tool adaptor to said housing with the axis of said sleeve coaxial with said shaft axis;

a drive coupling on said shaft and each said sleeve engaged upon mounting one of said tool adaptors on said housing to drivingly connect said shaft and said sleeve, said sleeve having a recess for receiving a mounting portion of a rotary machine tool, said recess being formed to transmit torque from said sleeve to said mounting portion; and said drive coupling on said shaft and each said sleeve including a tapered end on said drive shaft having peripherally spaced lobes which engage a complementary-shaped recess at the end of each said sleeve to drivingly interconnect said drive shaft and each said sleeve.

26. An apparatus for driving a rotating cutting tool comprising:

a motorized driver including a motor enclosed in a housing and driving a drive shaft in the housing and having an output end, said shaft having an axis about which it rotates;

a spindle unit having bearings for journaling a tool-receiving sleeve for rotation about a spindle axis which is coaxial with the axis of the drive shaft;

mounting means non-rotatable with the shaft on said housing and said spindle unit to detachably retain said spindle unit on said housing with said spindle axis aligned with said shaft axis;

a spindle journaled in the bearings and carrying one or more cutting tools for rotation about the spindle axis;

a cutting tool preset in said spindle;

a drive coupling on said shaft and said spindle engaged upon assembly of said spindle unit to said housing to connect said shaft and said spindle; and said spindle comprising an outer shell of substantially hyperboloid shape to reduce mass of the spindle and to contain cutting forces.

27. The apparatus in accordance with claim 26 in which at least one cutting insert is mounted on the outer end of the shell at a location spaced from the spindle axis.

28. The apparatus in accordance with claim 27 including means to deflect the shell to shift the insert radially inward to provide clearance space to withdraw the inserts and shell without scarring a previously machined surface.

29. In a rotating machine tool of the type having a driving head, a plurality of detachable rotary cutting tools and automatic means for selectively mounting and dismounting individual ones of said cutting tools with respect to said driving head, the combination comprising:
- a motorized drive head including a motor enclosed in a housing for driving a drive shaft mounted in said housing and having an output end, said drive shaft being rotatable about a drive shaft axis;
- a plurality of spindle units, each said spindle unit including a spindle housing and a single, tool-receiving shaft which is journaled on said spindle housing for rotation about a spindle axis which is coaxial with the drive shaft axis;
- spaced bearings in each of said spindles surrounding the spindle shaft and at least one bearing having an inner diameter radially adjacent to an outer diameter for the tool-receiving shaft to allow an increase in tool rotational speed;
- a plurality of cutting tools each having a shank preset within and received within a respective one of said shafts, drive means formed on respective ones of said shanks and said shafts to drivingly couple each said shank to a respective one of said shafts;
- mounting means on said housing and each said spindle unit to detachably retain any selected one of said spindle units on said housing with said spindle axis aligned with said shaft axis, said mounting means being non-rotatable with said shafts;
- a drive coupling formed by said drive shaft and any one of said tool-receiving shafts engaged upon assembly of any one of said spindle units to said housing to drivingly connect said drive shaft and said tool-receiving shaft;
- storage means for storing said plurality of spindle units each with a single tool therein adjacent to said motorized drive head; and
- automatically controlled mechanical transport means for transporting a selected one of said spindle units from said storage means and mounting said selected spindle units on said housing with said drive shaft and said tool-receiving shaft in driving engagement.

30. The combination of claim 29 wherein said plurality of spindle units support cutting tools having shanks of different diameter, said tool-receiving shafts in the spindles for cutting tool shanks of lesser diameter being smaller in outside diameter than the tool-receiving shafts in spindle units for cutting tool shanks of greater diameter to minimize the peripheral speeds of said shafts.

31. The combination of claim 29 wherein said spaced bearings are ball bearings of a minimum inside diameter to support said shafts and minimize the linear speeds in said bearings for a selected tool rotational speed.

32. The combination of claim 29 wherein said automatically controlled mechanical transport means is provided with means engageable with any selected one of said spindle units to remove said selected spindle unit from said storage means and transport said selected spindle unit to said housing, said transport means engaging said selected spindle unit with said spindle mounting means on said housing, and means locking said selected spindle unit with respect to said housing with said drive coupling between said shaft and the tool-receiving shaft of said selected spindle unit being drivingly engaged.

33. A rotating machine tool having means for selectively driving any one of a plurality of rotary cutting tools at high speed, comprising:
- a motorized driver including a motor enclosed in a housing driving a drive shaft having an output end extending from said housing, said shaft having an axis about which it rotates;
- a plurality of cutting tool adaptors for detachably mounting rotary cutting tools for selective driving engagement with said drive shaft, each said adaptor including an outer non-rotatable support having a central bore in which a tool-receiving sleeve is mounted for rotation on spaced bearings secured to said support within said bore, at least one of said spaced bearings being radially adjacent said tool;
- means non-rotatable with the sleeve for securing each tool adaptor to said housing with the axis of said sleeve coaxial with said shaft axis;
- a drive coupling on said shaft and each said sleeve engaged upon mounting one of said tool adaptors on said housing is drivingly connect said shaft and said sleeve, said sleeve having a recess for receiving a mounting portion of a rotary machine tool, said recess being formed to transmit torque from said sleeve to said mounting portion; and
- said rotary machine tool comprising at least one cutting tool insert mounted in a recess at the outer end of said sleeve at a location spaced from said sleeve axis.

34. A rotating machine tool as recited in claim 33 wherein said sleeve is substantially hyperboloid in shape to reduce the mass of the sleeve and to contain the cutting forces applied to said cutting tool.

* * * * *

UNITED STATES PATENT AND TRADEMARK OFFICE
CERTIFICATE OF CORRECTION

PATENT NO. : 5,322,494
DATED : June 21, 1994
INVENTOR(S) : Holtey, et al.

It is certified that error appears in the above-indentified patent and that said Letters Patent is hereby corrected as shown below:

Column 16, line 1, change "driven" to --drive--.

Column 16, line 45, change "driving" to --drive--.

Column 19, line 56, delete "pl".

Column 24, line 36, change "is" to --to--.

Signed and Sealed this

Twentieth Day of September, 1994

Attest:

BRUCE LEHMAN

Attesting Officer

Commissioner of Patents and Trademarks